United States Patent
Ihm et al.

(10) Patent No.: US 8,432,828 B2
(45) Date of Patent: Apr. 30, 2013

(54) METHOD OF TRANSMITTING DATA IN MULTIPLE ANTENNA SYSTEM

(75) Inventors: Bin Chul Ihm, Anyang-si (KR); Wook Bong Lee, Anyang-si (KR); Moon Il Lee, Anyang-si (KR); Su Nam Kim, Anyang-si (KR); Sung Ho Park, Anyang-si (KR); Ja Ho Koo, Anyang-si (KR); Dong Guk Lim, Anyang-si (KR); Jin Young Chun, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 293 days.

(21) Appl. No.: 13/055,270

(22) PCT Filed: Jul. 22, 2009

(86) PCT No.: PCT/KR2009/004048
§ 371 (c)(1),
(2), (4) Date: Jan. 21, 2011

(87) PCT Pub. No.: WO2010/011078
PCT Pub. Date: Jan. 28, 2010

(65) Prior Publication Data
US 2011/0176442 A1    Jul. 21, 2011

Related U.S. Application Data

(60) Provisional application No. 61/083,160, filed on Jul. 23, 2008.

(30) Foreign Application Priority Data

Dec. 24, 2008 (KR) .................. 10-2008-0132986

(51) Int. Cl.
*H04J 1/16* (2006.01)

(52) U.S. Cl.
USPC .......................................... 370/252; 370/330

(58) Field of Classification Search .................. 370/252, 370/236.1, 330, 334
See application file for complete search history.

(56) References Cited

U.S. PATENT DOCUMENTS

| | | | |
|---|---|---|---|
| 2005/0014474 A1* | 1/2005 | Jitsukawa et al. | 455/101 |
| 2007/0207730 A1* | 9/2007 | Nguyen et al. | 455/39 |
| 2008/0232327 A1* | 9/2008 | Kuroyanagi et al. | 370/335 |

FOREIGN PATENT DOCUMENTS

| | | |
|---|---|---|
| KR | 10-2007-0077008 A | 7/2007 |
| KR | 10-2007-0080538 A | 8/2007 |
| KR | 1020080021494 | 3/2008 |
| KR | 1020080050629 | 6/2008 |
| WO | 01-43309 A2 | 6/2001 |

* cited by examiner

*Primary Examiner* — Brian D Nguyen
(74) *Attorney, Agent, or Firm* — Lee, Hong, Degerman, Kang & Waimey

(57) ABSTRACT

A method of transmitting data in a multiple antenna system, including: transmitting a channel estimation signal including a first pilot for channel estimation of a first UE supporting multiple antennas and a second pilot for channel estimation of a second UE supporting a larger number of multiple antennas than that of the first UE; and receiving feedback data in response to the channel estimation signal.

13 Claims, 5 Drawing Sheets

METHOD OF TRANSMITTING DATA IN MULTIPLE ANTENNA SYSTEM

CROSS-REFERENCE TO RELATED APPLICATIONS

This application is a 371 U.S. national stage application of International Application No. PCT/KR2009/004048, filed on Jul. 22, 2009, which claims priority to Korean Application No. 10-2008-0132986, filed on Dec. 24, 2008, and U.S. Provisional Application Ser. No. 61/083,160, filed on Jul. 23, 2008, the contents of which are incorporated by reference herein in their entirety.

TECHNICAL FIELD

The present invention relates to wireless communication and, more particularly, to a method of transmitting data using multiple antennas.

BACKGROUND ART

Recently, a multiple input multiple output (MIMO) system receives much attention to maximize the performance and communication capacity of a wireless communication system. Emerging from the use of a single transmission antenna and a single reception antenna as it has been to date, the MIMO technique employs multiple transmission antennas and multiple reception antennas to enhance a data transmission/reception efficiency. The MIMO system, also called a multiple antenna system, is an application of a technique that collects data fragments received via several antennas for completion, rather than relying on a single antenna path, to receive a single overall message. As a result, a data rate at a particular range can be improved or a system range can be increased over a particular data rate.

The MIMO technique includes transmit diversity, spatial multiplexing, beamforming, and the like. The transmit diversity is a technique that transmits the same data from multiple transmission antennas to thus enhance a transmission reliability. Spatial multiplexing is a technique that simultaneously transmits different data from multiple transmission antennas to thus transmit high speed data without increasing a bandwidth of a system. Beamforming is used to increase a signal to interference plus noise ratio (SINR) of a signal by adding a weight value according to a channel state at multiple antennas. In this case, the weight value may be represented by a weight vector or a weight matrix, and it is called a precoding vector or a precoding matrix.

Spatial multiplexing includes spatial multiplexing for a single user and spatial multiplexing for multiple users. The spatial multiplexing for a single user is called a single user MIMO (SU-MIMO), and the spatial multiplexing for multiple users is called spatial division multiple access (SDMA) or multi-user MIMO (MU-MIMO). The capacity of a MIMO channel increases in proportion to the number of antennas. The MIMO channel may be disintegrated into independent channels. If the number of transmission antennas is Nt and the number of reception antennas is Nr, the number of independent channels Ni is Ni$\leq$min $\{Nt, Nr\}$. Each independent channel may be a spatial layer. A rank is the number of non-zero eigenvalue of the MIMO channel, which may be defined as the number of spatial streams that can be multiplexed.

The number of transmission antennas of a terminal (i.e., user equipment (UE)) supporting the MIMO technique may vary depending on the performance of the UE. A base station (BS) must transmit data in consideration of a UE that can support a smaller number of transmission antennas than a maximum number of transmission antennas as well as a UE that supports the maximum number of transmission antennas. For example, if the BS has eight transmission antennas (Tx), the BS should employ an 8Tx MIMO technique to transmit data to a UE that can receive the data via eight transmission antennas and employ a 4Tx MIMO technique to transmit data to a UE that can receive the data via four transmission antennas.

Thus, in such an environment in which UEs each support different number of transmission antennas, a data transmission method with which the BS can satisfy the performance of all the UEs is required.

DISCLOSURE OF INVENTION

Technical Problem

Therefore, an object of the present invention is to provide a method for effectively transmitting data to user equipments (UEs) each supporting a different number of transmission antennas.

Technical Solution

In an aspect, a method of transmitting data in a multiple antenna system, including: transmitting a channel estimation signal including a first pilot for channel estimation of a first UE supporting multiple antennas and a second pilot for channel estimation of a second UE supporting a larger number of multiple antennas than that of the first UE; and receiving feedback data in response to the channel estimation signal.

In another aspect, a method of estimating channel in a multiple antenna system, including: receiving a channel estimation signal including a first pilot for first multiple antennas and a second pilot for second multiple antennas, wherein the first pilot and the second pilot are linearly combined to all the multiple antennas; and estimating a channel of at least one of the first multiple antennas and the second multiple antennas by using the channel estimation signal.

Advantageous Effects

The data transmission method in a multiple antenna system according to embodiments of the present invention can support both a UE supporting a 4Tx MIMO technique and a UE supporting an 8Tx MIMO technique, and although an 8Tx system uses a precoding scheme of a 4Tx system, transmission power at every antenna can be uniformly maintained.

MODE FOR THE INVENTION

Figure 1:
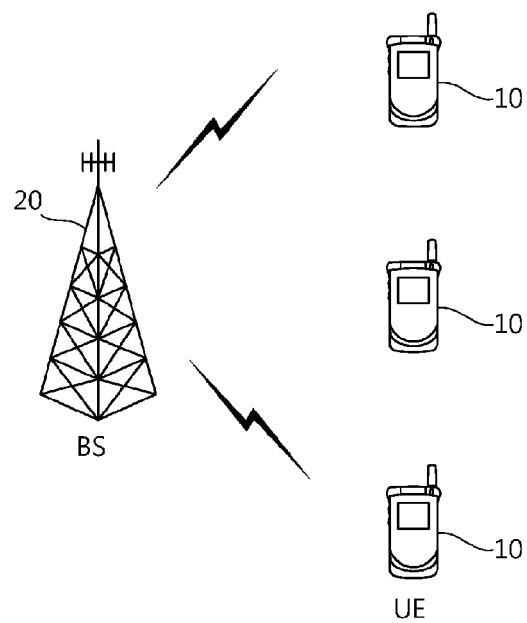
FIG. 1 shows a wireless communication system.

FIG. 1 shows a wireless communication system. The wireless communication system is widely used to provide a variety of communication services such as communication of voice, packet data, etc.

Referring to FIG. 1, the wireless communication system includes user equipments (UEs) 10 and a base station (BS) 20. The UEs 10 may be fixed or mobile, and may be referred to by other names such as mobile station (MS), user terminal (UT), subscriber station (SS), wireless device, etc. The BS 20 generally refers to a fixed station that communicates with the UEs 10 and may be called by other names such as node-B, base transceiver system (BTS), access point (AP), etc. One or more cells may exist within the coverage of the BS 20.

Hereinafter, downlink refers to communication link from the BS 20 to the UEs 10, and uplink refers to communication link from the UEs 10 to the BS 20. In the downlink, a transmitter may be a part of the BS 20, and a receiver may be a part of the UEs 10. In the uplink, a transmitter may be a part of the UEs 10, and a receiver may be a part of the BS 20.

The wireless communication system may be an OFDM (Orthogonal Frequency Division Multiplexing)/OFDMA (Orthogonal Frequency Division Multiple Access)-based system. OFDM uses a plurality of orthogonal subcarriers. OFDM uses orthogonality between IFFT (inverse fast Fourier Transform) and FFT (fast Fourier Transform). A transmitter performs IFFT on data and transmits the same. A receiver performs FFT on a reception signal to restore the original data. The transmitter uses IFFT to combine multiple subcarriers, and the receiver uses corresponding FFT to separate the multiple subcarriers.

The wireless communication system may be a multiple antenna system. The multiple antenna system may be a multiple-input multiple-output (MIMO) system. Or, the multiple antenna system may be a multiple-input single-output (MISO) system, a single-input single-output (SISO) system, or a single-input multiple-output (SIMO) system. The MIMO system uses a plurality of transmission antennas and a plurality of reception antennas. The SISO system uses a single transmission antenna and a single reception antenna. The SIMO system uses a single transmission antenna and a plurality of reception antennas.

In the multiple antenna system, STC (Space-Time Coding) such as an SFBC (Space Frequency Block Code) or STBC (Space Time Block Code), CDD (Cyclic Delay Diversity), FSTD (frequency switched transmit diversity), TSTD (time switched transmit diversity), and the like, may be used as a multiple antenna using scheme at a rank 1. At a rank 2 or larger, spatial multiplexing (SM), GCDD (Generalized Cyclic Delay Diversity), S-VAP (Selective Virtual Antenna Permutation), and the like, may be used. The SFBC is a scheme that can secure both a diversity gain and a multiple user scheduling gain at a space domain and a frequency domain by effectively applying selectivity at the corresponding domains. The STBC is a scheme for applying selectivity at the space domain and a time domain. The FSTD is a scheme for discriminating signals transmitted via multiple antennas by frequency, and the TSTD is a scheme for discriminating signals transmitted via multiple antennas by time. SM is a scheme for increasing a transmission rate by transmitting different data via each antenna. GCDD is a scheme for applying selectivity at the time domain and the frequency domain. The S-VAP, a scheme for using a single precoding matrix, includes a multi-codeword (MCW) S-VAP for mixing multiple codewords among antennas in space diversity or space multiplexing and a single codeword (SCW) S-VAP using a single codeword.

Figure 2:
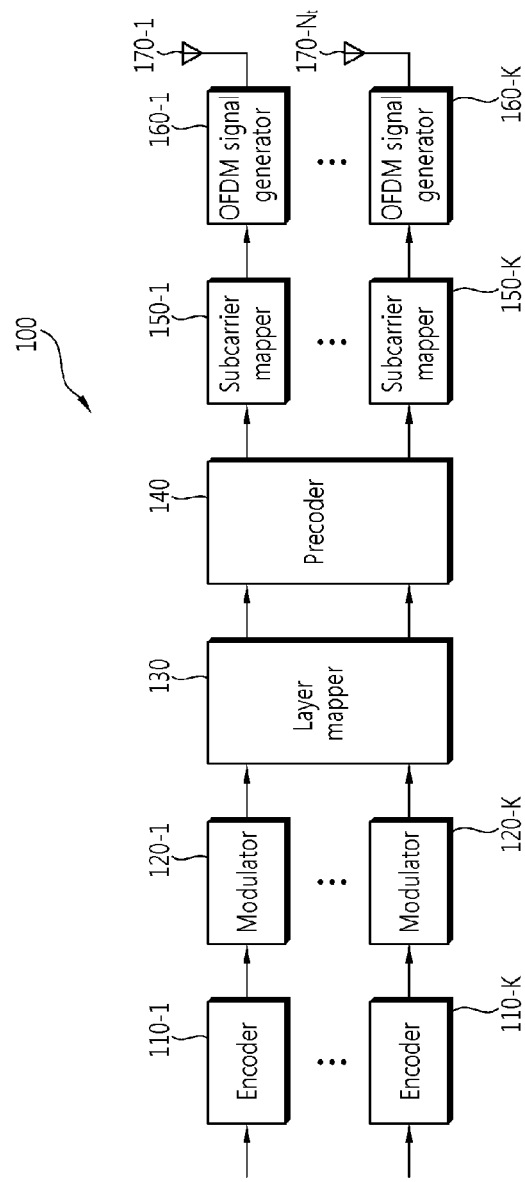
FIG. 2 shows an example of transmitter.

FIG. 2 shows an example of a transmitter.

Referring to FIG. 2, the transmitter 100 includes encoders 110-1, ..., 110-K, modulators 120-1, ..., 120-K, a layer mapper 130, a precoder 140, subcarrier mappers 150-1, ..., 150-K, and OFDM signal generators 160-1, ..., 160-K. The transmitter 100 further includes Nt (Nt≧1) number of transmission antennas 170-1, ..., 170-Nt.

The encoders 110-1, ..., 110-K encode input data according to a predetermined coding scheme to form coded data. The modulators 120-1, ..., 120-K dispose the coded data as symbols representing positions on a signal constellation. There is no limitation in the modulation scheme, and the modulation scheme may be m-phase shift keying (m-PSK) or m-quadrature amplitude modulation (m-QAM). For example, m-PSK may be BPSK, QPSK, or 8-PSK, and the m-QAM may be 16-QAM, 64-QAM, or 256-QAM.

The layer mapper 130 defines layers of the input symbols so that antenna-specific symbols can be distributed to paths of respective antennas. The layers are defined as information paths input to the precoder 140. Information paths before the precoder 140 may be called virtual antennas or layers.

The precoder 140 processes the input symbols according to the MIMO scheme based on the multiple transmission antennas 170-1, ..., 170-Nt. For example, the precoder 140 may perform codebook-based precoding. The precoder 140 distributes the antenna-specific symbols to the subcarrier mappers 150-1, ..., 150-K of paths of corresponding antennas. Each information path sent to a single antenna via a single subcarrier mapper by the precoder 140 is called a stream, which may be a physical antenna.

The subcarrier mappers 150-1, ..., 150-K allocate the input symbols to proper subcarriers and multiplex them according to users. The OFDM signal generators 160-1, ..., 160-K modulate the input symbols according to the OFDM scheme and output OFDM symbols. The OFDM signal generators 160-1, ..., 160-K may perform IFFT on the input symbols, and a cyclic prefix (CP) may be inserted into the time domain symbols on which IFFT has been performed. The OFDM symbols are transmitted via the respective transmission antennas 170-1, ..., 170-Nt.

In the MIMO system, the transmitter 100 may operate in two types of modes: the SCW mode and the MCW mode. In the SCW mode, transmission signals transmitted via the MIMO channels have the same data rate. In the MCW mode, data transmitted via the MIMO channels are independently encoded, so they may have different data rates. The MCW mode is operated when the rank is larger than 1.

Figure 3:
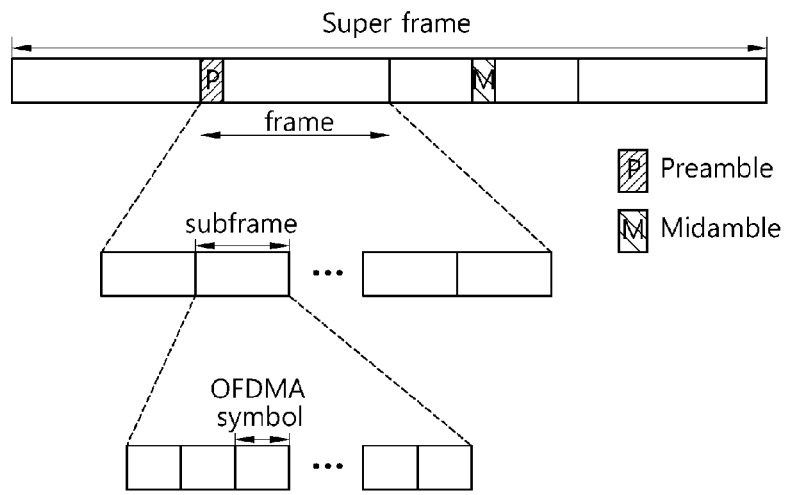
FIG. 3 shows an example of frame.

FIG. 3 shows an example of a frame.

Referring to FIG. 3, a superframe or a radio frame may include at least one frame. Here, it is shown that the superframe includes four frames, but there is no limitation in the number of frames included in the superframe. A superframe header may be allocated to the foremost portion in the time domain of the superframe. The superframe header may include system configuration information, information about configured frames within the superframe.

The frame may include at least one subframe. A single frame may be transmitted at 1 transmission time interval (TTI), during which data can be transmitted at a time. A preamble (also called a synchronization channel) may be allocated to some of the symbols of the frame. A midamble may be allocated to the other symbols to which the preamble has not been allocated. The preamble and midamble may be transmitted via at least one OFDMA symbol. The preamble is allocated for time and frequency synchronization, and the midamble may be allocated for synchronization or channel estimation of a UE. The preamble and midamble may be configured as different sequences discriminating antennas in the multiple antenna system, or may be configured as the same sequences but each with a different weight value so as to be transmitted. The preamble may be transmitted for each frame, while the midamble may be transmitted via an arbitrary frame, not for each frame. Here, the preamble is shown to be transmitted by frames, it may be also transmitted by superframes. Namely, the preamble may be included in the header of a superframe, and the midamble may be allocated to a certain frame in the superframe.

A subframe includes a plurality of OFDMA symbols in a time domain and a plurality of subcarriers in a frequency domain. The subframe may include at least one resource block. A resource block is a basic unit of radio resources allocated to a single user, and one or more resource blocks may be allocated to a single user. The resource block may be defined as a plurality of subcarriers. For example, the resource block may be defined as twelve subcarriers contiguous in the frequency domain. The subframe may include two slots in the time domain, and a single slot may include six to seven OFDMA symbols.

Some OFDMA symbols included in the subframe may be allocated as a control channel for transmission of control information, and the other remaining OFDMA symbols may be allocated as a data channel for transmission of data the front first to third OFDMA symbols of a downlink subframe may be used as a downlink control channel and the other remaining OFDMA symbols may be used as a data channel. The downlink control channel includes a PCFICH (physical control format indicator channel) and a PDCCH (physical downlink control channel). The downlink data channel includes a PDSCH (physical downlink shared channel). The PCFICH is a channel informing about the number of OFDMA symbols through which the PDCCH is transmitted, and the number of OFDMA symbols through which the PDCCH is transmitted may be 1 to 3. The PDCCH is a channel informing about resource allocation of the PDSCH, resource allocation of a PUSCH (physical uplink shared channel), power control information, and the like. Pilot (or a reference signal) for channel estimation may be allocated to a subframe. The pilot for channel estimation may include a common pilot and a user specific pilot.

A data transmission method supporting UEs each supporting different number of transmission antennas will now be described. For the sake of explanation, four transmission antennas will be referred as 4Tx, eight transmission antennas will be referred to as 8Tx, a UE supporting 4Tx will be referred as a 4Tx UE, a UE supporting 8Tx will be referred as a 8Tx UE, a common pilot with respect to four transmission antennas will be referred to as a 4Tx common pilot, and a common pilot with respect to eight transmission antennas will be referred to as an 8Tx common pilot. The 4Tx UE means a UE supporting a smaller number of antennas, and the 8Tx UE means a UE1 supporting a larger number of antennas.

The method of supporting both the 4Tx UE and the 8Tx UE will now be described as an example, but the number of transmission antennas is merely illustrative and the number of transmission antennas supported by a UE may be determined variably.

Figure 4:
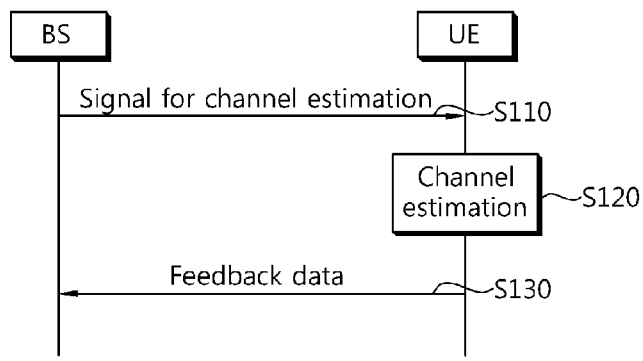
FIG. 4 shows a flow chart illustrating the process of a data transmission method in a multiple antenna system according to one exemplary embodiment of the present invention.

FIG. 4 shows a flow chart illustrating the process of a data transmission method in a multiple antenna system according to one exemplary embodiment of the present invention.

Referring to FIG. 4, a BS transmits a signal for a channel estimation (S110). The signal for a channel estimation may be one of a common pilot, a user specific pilot, and a midamble that can simultaneously support UEs each supporting a different number of transmission antennas.

In a method for configuring a 8Tx channel estimation signal, a 4Tx common pilot may be added to a 4Tx common pilot supporting a channel estimation of a 4Tx UE to configure a 8Tx channel estimation signal. The original 4Tx common pilot may be allocated to #1 to #4 antennas among 8Tx antennas, and the added 4Tx common pilot may be allocated to the #5 to #8 antennas among the 8Tx antennas. The 4Tx UE may perform channel estimation by using the original 4Tx common pilot. The 4Tx UE may calculate a precoding matrix index (PMI) of a closed loop MIMO, select the best band, or configure feedback information for an application of a 4Tx MIMO technique, based on the channel estimation. The 8Tx UE may perform channel estimation by using every common pilot. The 8Tx UE may calculate a PMI, select the best band, or configure feedback information for an application of a 8Tx MIMO technique, based on the channel estimation. The common pilot allocated to the #5 to #8 antennas may be disposed with the common pilot allocated to the #1 to #4 antennas according to a CDM (code division multiplex) scheme, a FDM (frequency division multiplex) scheme, or a TDM (time division multiplex) scheme.

Adding of the 4Tx common pilot to the original 4Tx common pilot is the simplest method. However, when the 4Tx UE and the 8Tx UE are simultaneously allocated resources, transmission power of the #1 to #4 antennas may be stronger than that of the #5 to #8 antennas. In case of an open-loop MIMO, a method of evenly using the #1 to #8 antennas may be introduced to make transmission power of the antennas equally distributed, but in case of a closed-loop MIMO, because precoding is used, the transmission power of the #1 to #4 antennas may stronger than that of #5 to #8 antennas. In particular, if a 4Tx codebook uses a precoding matrix or vector having constant modulus (CM) characteristics, there may be a difference between the transmission power of the #1 to #4 antennas and that of the #5 to #8 antennas.

Table 1 below shows an example of transmission power of antennas when both 4Tx precoding an 8Tx precoding are applied. It is assumed that the 4Tx codebook and 8Tx codebook use the precoding matrix having the CM characteristics.

TABLE 1

| Antenna | PRB | | | | | | Total Tx power |
|---|---|---|---|---|---|---|---|
| | #1 | #2 | #3 | #4 | #5 | #6 | |
| Tx #1 | 1 | 1 | 1 | 0.5 | 0.5 | 0.5 | 4.5 |
| Tx #2 | 1 | 1 | 1 | 0.5 | 0.5 | 0.5 | 4.5 |
| Tx #3 | 1 | 1 | 1 | 0.5 | 0.5 | 0.5 | 4.5 |
| Tx #4 | 1 | 1 | 1 | 0.5 | 0.5 | 0.5 | 4.5 |
| Tx #5 | | | | 0.5 | 0.5 | 0.5 | 1.5 |
| Tx #6 | | | | 0.5 | 0.5 | 0.5 | 1.5 |
| Tx #7 | | | | 0.5 | 0.5 | 0.5 | 1.5 |
| Tx #8 | | | | 0.5 | 0.5 | 0.5 | 1.5 |

If the 4Tx codebook is applied to #1 to #3 physical resource blocks (PRBs) and precoded and if the 8Tx codebook is applied to #4 to #6 PRBs and precoded, then, the #1 to #4 antennas must transmit signals for the larger number of PRBs than those for the #5 to #8 antennas, consuming more power. This means that the #1 to #4 antennas require a power amplifier (PA) having a larger linear range than that of the #5 to #8 antennas. Namely, four out of the eight antennas must use a high-priced PA.

In a method for configuring a 8Tx channel estimation signal while maintaining equal power at all the antennas, the common pilot is classified into first and second common pilots and such disposed.

The first common pilot is transmitted in the form of linear combination of the #1 to #8 antennas. The 4Tx UE may estimate channels by using only the first common pilot. In this case, the 4Tx UE estimates the four linearly combined channels, rather than estimating eight channels of the eight antennas. The four channels estimated thusly are called equivalent channels. Both the 4Tx open-loop MIMO and the 4Tx closed-loop MIMO schemes can be supported by using the equivalent channels.

Equation 1 below shows an example of a linear combination of the first common pilot at the kth tone of the first common pilot.

MathFigure 1

$$\text{Tx vector} = W_{8\times 4}\begin{bmatrix} p_1(k) \\ p_2(k) \\ p_3(k) \\ p_4(k) \end{bmatrix} \quad [\text{Math.1}]$$

wherein $p_m(k)$ is a pilot sequence at the kth tone of the mth equivalent antenna.

Equation 2 below shows an example of implementation by applying cyclic delay diversity (CDD) to Equation 1:

MathFigure 2

$$W_{8\times 4}(k) = c(k)\begin{bmatrix} 1 & 0 & 0 & 0 \\ 0 & 1 & 0 & 0 \\ 0 & 0 & 1 & 0 \\ 0 & 0 & 0 & 1 \\ e^{j\theta_1(k)} & 0 & 0 & 0 \\ 0 & e^{j\theta_2(k)} & 0 & 0 \\ 0 & 0 & e^{j\theta_3(k)} & 0 \\ 0 & 0 & 0 & e^{j\theta_4(k)} \end{bmatrix} \quad [\text{Math.2}]$$

wherein c(k) is a normalization factor.

In this manner, when the first common pilot is linearly combined with the #1 to #8 antennas and transmitted, although the precoding vector or precoding matrix having the CM characteristics is directly applied to the equivalent channels, the same transmission power is allocated to the #1 to #8 antennas.

In addition, although the 4Tx precoding vector or precoding matrix having the CM characteristics is applied, the same transmission power is maintained at the #1 to #8 antennas. Equation 3 below shows an example of application of the 4Tx precoding matrix to Equation 2.

MathFigure 3

$$W_{8\times 4}(k)U_{4\times 1} = c(k)\begin{bmatrix} 1 & 0 & 0 & 0 \\ 0 & 1 & 0 & 0 \\ 0 & 0 & 1 & 0 \\ 0 & 0 & 0 & 1 \\ e^{j\theta_1(k)} & 0 & 0 & 0 \\ 0 & e^{j\theta_2(k)} & 0 & 0 \\ 0 & 0 & e^{j\theta_3(k)} & 0 \\ 0 & 0 & 0 & e^{j\theta_4(k)} \end{bmatrix} d(k) \begin{bmatrix} \exp(j\phi_1) \\ \exp(j\phi_2) \\ \exp(j\phi_3) \\ \exp(j\phi_4) \end{bmatrix} \quad [\text{Math.3}]$$

$$= e(k)\begin{bmatrix} \exp(j\phi_1) \\ \exp(j\phi_2) \\ \exp(j\phi_3) \\ \exp(j\phi_4) \\ \exp(j\phi_1 + j\theta_1(k)) \\ \exp(j\phi_2 + j\theta_2(k)) \\ \exp(j\phi_3 + j\theta_3(k)) \\ \exp(j\phi_4 + j\theta_4(k)) \end{bmatrix}$$

The second common pilot is transmitted in the form of another linear combination of the #1 to #8 antennas. The 4Tx UE does not use the second common pilot; only the 8Tx UE uses the second common pilot. In case of using the 8Tx closed-loop MIMO scheme, direct application of the precoding vector or the precoding matrix to the eight equivalent channels may cause the transmission power of the antennas to be different according to the precoding vector or the precoding matrix, having a possibility of losing the CM characteristics. Thus, the UE supporting the 8Tx closed-loop MIMO scheme should recover the original eight channels from the eight equivalent channels.

Equation 4 below shows an example of a linear combination of the second common pilot at the kth tone of the second common pilot, aiming to easily recover the eight original channels from the eight equivalent channels.

MathFigure 4

$$\text{Tx vector} = V_{8\times 4}\begin{bmatrix} p_5(k) \\ p_6(k) \\ p_7(k) \\ p_8(k) \end{bmatrix} \quad [\text{Math.4}]$$

wherein $p_m(k)$ is a pilot sequence at the kth tone of the mth equivalent antenna.

Equation 5 below shows an example of implementation by applying cyclic delay diversity (CDD) to Equation 4:

MathFigure 5

$$V_{8\times 4}(k) = c(k) \begin{bmatrix} 1 & 0 & 0 & 0 \\ 0 & 1 & 0 & 0 \\ 0 & 0 & 1 & 0 \\ 0 & 0 & 0 & 1 \\ -e^{j\theta_1(k)} & 0 & 0 & 0 \\ 0 & -e^{j\theta_2(k)} & 0 & 0 \\ 0 & 0 & -e^{j\theta_3(k)} & 0 \\ 0 & 0 & 0 & -e^{j\theta_4(k)} \end{bmatrix} \quad [\text{Math.5}]$$

wherein c(k) is a normalization factor.

The first and second common pilots may have a form of a reference signal or a midamble. A preamble may perform the function of the first and second common pilots according to a system.

Meanwhile, the linear combination of the first and second common pilots may be represented by a form of multiplying a certain permutation matrix to $Wg_{8\times 4}$ and $V_{8\times 4}$. Equation 6 below shows an example of multiplying a certain permutation matrix to the linear combination of the first and second common pilots.

MathFigure 6

$$P_{8\times 8}W_{8\times 4}P_{4\times 4} = \begin{bmatrix} 0 & 0 & e^{j\theta_4(k)} & 0 \\ 0 & 0 & 0 & 1 \\ 1 & 0 & 0 & 0 \\ 0 & 0 & 1 & 0 \\ 0 & e^{j\theta_1(k)} & 0 & 0 \\ e^{j\theta_2(k)} & 0 & 0 & 0 \\ 0 & 0 & 0 & e^{j\theta_3(k)} \\ 0 & 1 & 0 & 0 \end{bmatrix} \quad [\text{Math.6}]$$

$$P_{8\times 8}V_{8\times 4}P_{4\times 4} = \begin{bmatrix} 0 & 0 & -e^{j\theta_4(k)} & 0 \\ 0 & 0 & 0 & 1 \\ 1 & 0 & 0 & 0 \\ 0 & 0 & 1 & 0 \\ 0 & -e^{j\theta_1(k)} & 0 & 0 \\ -e^{j\theta_2(k)} & 0 & 0 & 0 \\ 0 & 0 & 0 & -e^{j\theta_3(k)} \\ 0 & 1 & 0 & 0 \end{bmatrix}$$

The 8Tx UE must know matrixes representing the linear combination method of the first and second common pilots.

The CDD factor $e^{j\theta_m(k)}$ of $W_{8\times 4}$ and $V_{8\times 4}$ may be included in the pilot sequence $p_m(k)$, and the first and second common pilots may be represented by Equation 7 shown below:

MathFigure 7

At $k^{th}$ tone of common pilot_1: [Math.7]

$$Tx \text{ vector} = c(k) \begin{bmatrix} 1 & 0 & 0 & 0 \\ 0 & 1 & 0 & 0 \\ 0 & 0 & 1 & 0 \\ 0 & 0 & 0 & 1 \\ 1 & 0 & 0 & 0 \\ 0 & 1 & 0 & 0 \\ 0 & 0 & 1 & 0 \\ 0 & 0 & 0 & 1 \end{bmatrix} \begin{bmatrix} \tilde{p}_1(k) \\ \tilde{p}_2(k) \\ \tilde{p}_3(k) \\ \tilde{p}_4(k) \end{bmatrix}$$

At $k^{th}$ tone of common pilot_2:

$$Tx \text{ vector} = c(k) \begin{bmatrix} 1 & 0 & 0 & 0 \\ 0 & 1 & 0 & 0 \\ 0 & 0 & 1 & 0 \\ 0 & 0 & 0 & 1 \\ -1 & 0 & 0 & 0 \\ 0 & -1 & 0 & 0 \\ 0 & 0 & -1 & 0 \\ 0 & 0 & 0 & -1 \end{bmatrix} \begin{bmatrix} \tilde{p}_5(k) \\ \tilde{p}_6(k) \\ \tilde{p}_7(k) \\ \tilde{p}_8(k) \end{bmatrix}$$

wherein $\tilde{p}_m(k)$ is a pilot sequence of the kth tone of the mth equivalent antenna.

Upon receiving the signal for channel estimation, the UE performs channel estimation (S120). The 4Tx UE knows the linear combination form of the first common pilot, and can estimate channels by using the first common pilot. The 8Tx UE knows the linear combination form of the first and second common pilots, and can estimate channels by using the first and second common pilots.

The UE transmits feedback data to the BS (S130). In this case, the UE may configure the feedback data required for application of the MIMO technique by using information obtained through the channel estimation. The UE may configure the feedback data by selecting the best band, obtaining a PMI of the best band, and obtaining a CQI based on the PMI, using the channel estimation. The UE transmits the configured feedback data to the BS.

<Pilot Disposition>

In the case where the first common pilot for the 4Tx UE is transmitted via eight antennas, pilot for channel estimation of equivalent antennas may be transmitted for each pilot tone. For example, pilot for channel estimation of the equivalent antenna #1 may be created as represented by Equation 8 shown below:

MathFigure 8

$$W_{8\times 4} \begin{bmatrix} p_1(k) \\ 0 \\ 0 \\ 0 \end{bmatrix} = c(k) \begin{bmatrix} p_1(k) \\ 0 \\ 0 \\ 0 \\ e^{j\theta_1(k)}p_1(k) \\ 0 \\ 0 \\ 0 \end{bmatrix} \quad [\text{Math.8}]$$

The 8Tx UE may use the 4Tx open-loop MIMO scheme as an open-loop MIMO scheme. In this case, both the 8Tx UE and the 4Tx UE may use the 4Tx open-loop MIMO scheme by using only the #1 to #4 equivalent antennas. When the 8Tx UE uses the 8Tx closed-loop MIMO scheme, the second common pilot should be disposed to estimate the channels of the #5 to #8 equivalent antennas. The second common pilot may not necessarily be disposed at each subframe but be disposed at certain periods. The subframe including the second common pilot disposed therein may be indicated through a downlink control channel.

The subframe including only the first common pilot disposed therein is called a subframe type 1, and a subframe including the first and second common pilots disposed therein is called a subframe type 2.

Pilot disposition in the subframe types 1 and 2 will now be described.

Figure 5:
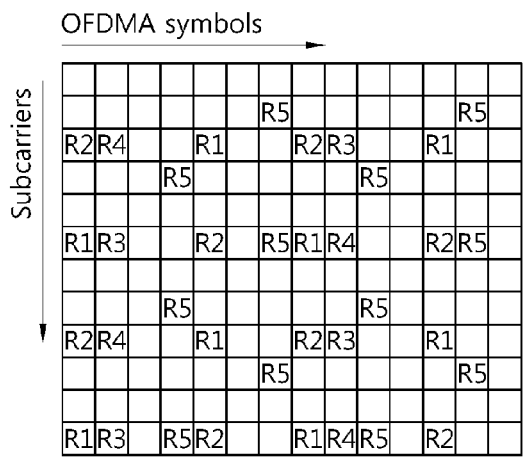
FIG. 5 shows a pilot disposition according to one exemplary embodiment of the present invention.

FIG. 5 shows a pilot disposition according to one exemplary embodiment of the present invention, in which first common pilots and user specific pilots are disposed in the subframe type 1.

Referring to FIG. 5, in the subframe type 1, both the 4Tx UE and the 8Tx UE may use the same open-loop MIMO scheme, and the 4Tx UE may use the 4Tx closed-loop MIMO scheme. If the 8Tx UE uses the 8Tx closed-loop MIMO scheme in the subframe type 1, it may demodulate a reception signal by using a user specific pilot.

R1 to R4 are illustrated to represent the first common pilots as disposed, and R5 is illustrated to represents the user specific pilots as disposed. The first common pilots and the user specific pilots may be disposed variably.

Figure 6:
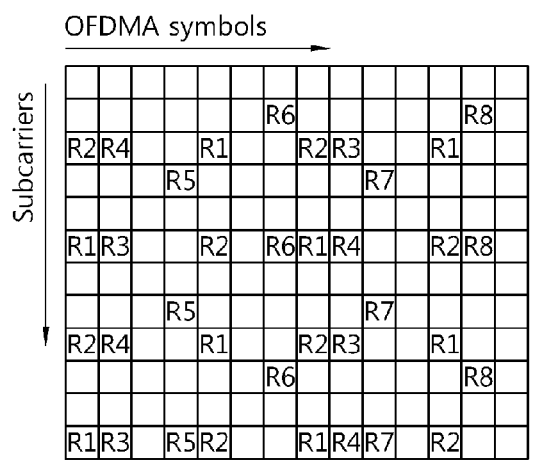
FIG. 6 shows a pilot disposition according to another exemplary embodiment of the present invention.

FIG. 6 shows a pilot disposition according to another exemplary embodiment of the present invention, in which first common pilots and user specific pilots are disposed in the subframe type 1.

Referring to FIG. 6, the user specific pilots may support a single stream or may be deformed to support multiple streams. As illustrated, as the user specific pilots, R5 for estimating a channel of a stream #1, R6 for estimating a channel of a stream #2, R7 for estimating a channel of a stream #3, and R8 for estimating a channel of a stream #4 may be disposed.

R1 to R4 are illustrated to represent the first common pilots as disposed, and R5 to R8 are illustrated to represent the user specific pilots as disposed. The first common pilots and the user specific pilots may be disposed variably.

In the subframe type 2, the second common pilots are disposed. The second common pilots may be disposed by using the positions of the user specific pilots R5 to R8. In this case, the R5 to R8 are the second common pilots, and the second common pilots may be created by using V8×4. Equation below shows a configuration of the fifth pilot:

MathFigure 9

$$V_{8\times 4}\begin{bmatrix} p_5(k) \\ 0 \\ 0 \\ 0 \end{bmatrix} = c(k) \begin{bmatrix} p_5(k) \\ 0 \\ 0 \\ -e^{j\theta_1(k)}p_5(k) \\ 0 \\ 0 \\ 0 \end{bmatrix}$$ [Math.9]

Figure 7:
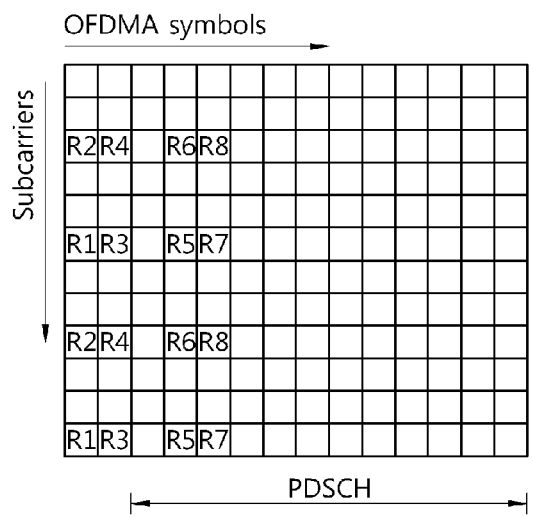
FIG. 7 shows a pilot disposition according to another exemplary embodiment of the present invention.

FIG. 7 shows a pilot disposition according to another exemplary embodiment of the present invention, in which first and second common pilots are disposed in the subframe type 2.

Referring to FIG. 7, disposing the second common pilots by using the position of the user specific pilots R5 to R8 is advantageous in that scheduling can be performed within a single subframe with respect to the 4Tx UE and the 8Tx UE, but with a possibility that overhead by pilots is excessively increased. Thus, in order to reduce overhead by pilots, the first common pilots may be disposed at a control channel region and the second common pilots may be disposed at a data region. The data region is where the user specific pilots can be disposed. Namely, the first common pilots may be allocated to the PDCCH region and the second common pilots may be allocated to the PDSCH region.

The information about the subframe type 2 may be transmitted via the PCFICH or PDCCH. When the 4Tx UE confirms the subframe type 2 via the PCFICH or the PDCCH, it may pass over the PDSCH region. The user specific pilot may be added to the PDSCH region at every resource block.

The first common pilots R1 to R4 may be generated according to Equation 8 shown above. The second common pilots R5 to R8 may be generated according to Equation 9 shown above. Channels of the #5 to #8 equivalent antennas may be estimated through the second common pilots R5 to R8.

Meanwhile, channels of the 4Tx antennas may be estimated through preambles according to a system. In the system available for channel estimation of the 4Tx antennas through preambles, only the second common pilots for channel estimation of the #5 to #8 equivalent antennas are added to a subframe. Namely, the preambles serve as the first common pilots. The pilots of the preambles may be configured to use the eight antennas by using $W_{8\times 4}$ as described above. The second common pilots may be configured by using $V_{8\times 4}$. In this case, the 8Tx UE should estimate channels of the eight antennas by using the preambles and the second common pilots, so the preambles and the second common pilots may be disposed at OFDMA symbols which are close in the time domain. The preambles and the second common pilots may be disposed at continuous OFDMA symbols.

Figure 8:
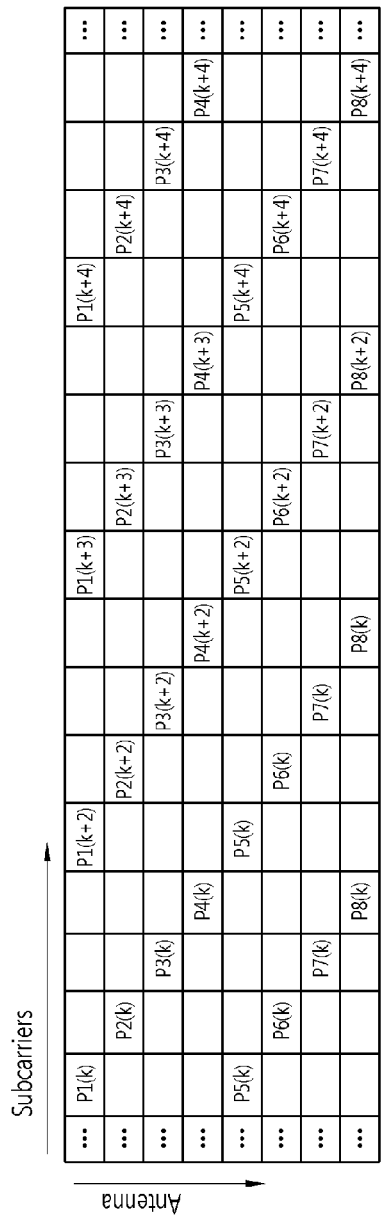
FIG. 8 shows a pilot disposition according to another exemplary embodiment of the present invention.

FIG. 8 shows a pilot disposition according to another exemplary embodiment of the present invention.

Referring to FIG. 8, there is a method providing pilots such that channels of eight antennas can be estimated with only the second common pilots. Each antenna may use the same pilot sequence or different pilot sequences. In order to allocate pilot sequences to every cell or sector, pilot sequences of all the antennas of each sector may be designated to be the same.

Pilot sequences P1 to P8 are disposed one by one at each of the eight antennas. In this case, P5, P6, P7, and P8 may be configured in the CDD version of P1, P2, P3, and P4 so as to be discriminated.

Equation 10 below shows an example of a CDD relationship between P5 and P1.

MathFigure 10

$$P_5(k) = P_1(k)e^{-j2\pi k\tau/N_{fft}}$$ [Math. 10]

As shown in Equation 10, P6 to P8 can be also represented in the same manner.

In spite of the possibility that overhead is increased compared with the disposition of the second common pilots as shown in FIG. 7, this method is advantageous in that the channel estimation is simple.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting data in a multiple antenna system, the method comprising:
    transmitting a signal comprising a first pilot for channel estimation of a first user equipment (UE) supporting a first number of antennas and a second pilot for channel estimation of a second UE supporting a second number of antennas, the second number being greater than the first number; and
    receiving feedback data in response to the signal,
    wherein the first pilot is assigned at a control channel region, and the second pilot is assigned at a data region.

2. The method of claim 1, wherein the first pilot is transmitted in a form of linear combination with respect to the second number of antennas supported by the second UE.

3. The method of claim 2, wherein the second pilot is transmitted in a form of linear combination, which is different from that of the first pilot, with respect to the second number of antennas supported by the second UE.

4. The method of claim 1, wherein the first pilot is a common pilot, and the second pilot is a user specific pilot.

5. The method of claim 1, wherein the signal is transmitted in a midamble.

6. The method of claim 1, wherein the first pilot is transmitted in a preamble, and the second pilot is transmitted in an adjacent orthogonal frequency division multiple access (OFDMA) symbol.

7. The method of claim 1, wherein configuration information of the second pilot is transmitted through a physical control format indicator channel (PCFICH) or a physical downlink control channel (PDCCH).

8. The method of claim 1, wherein one pilot sequence of the first pilot is generated based on linear combination between a first pilot sequence for a first transmit antenna and a second pilot sequence for a second transmit antenna, and the first transmit antenna and the second transmit antenna belong to the second number of antennas.

9. The method of claim 8, wherein a phase of the second pilot sequence for the second transmit antenna is shifted before performing the linear combination.

10. The method of claim 1, wherein the first and second number of the antennas are transmit antennas of a base station.

11. The method of claim 1, wherein at least one OFDMA symbol in which the control channel region is allocated is different from at least one OFDMA symbol in which the data region is allocated.

12. A method of receiving data in a multiple antenna system, the method comprising:
    receiving a signal from a base station, wherein the signal comprises a first pilot for channel estimation of a first user equipment (UE) supporting a first number of antennas and a second pilot for channel estimation of a second UE supporting a second number of antennas, and the second number is greater than the first number; and
    transmitting, to the base station, feedback data in response to the signal,
    wherein the first pilot is assigned at a control channel region, and the second pilot is assigned at a data region.

13. A user equipment comprising:
    a receiver for receiving a signal from a base station, wherein the signal comprises a first pilot for channel estimation of a first user equipment (UE) supporting a first number of antennas and a second pilot for channel estimation of a second UE supporting a second number of antennas, and the second number is greater than the first number; and
    a transmitter for transmitting, to the base station, feedback data in response to the signal,
    wherein the first pilot is assigned at a control channel region, and the second pilot is assigned at a data region.

* * * * *